US008160999B2

(12) United States Patent
Jin et al.

(10) Patent No.: US 8,160,999 B2
(45) Date of Patent: Apr. 17, 2012

(54) METHOD AND APPARATUS FOR USING SET BASED STRUCTURED QUERY LANGUAGE (SQL) TO IMPLEMENT EXTRACT, TRANSFORM, AND LOAD (ETL) SPLITTER OPERATION

(75) Inventors: Qi Jin, San Jose, CA (US); Hui Liao, Santa Clara, CA (US); Sriram K. Padmanabhan, San Jose, CA (US); Lin Xu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1265 days.

(21) Appl. No.: 11/610,480

(22) Filed: Dec. 13, 2006

(65) Prior Publication Data
US 2008/0147707 A1    Jun. 19, 2008

(51) Int. Cl.
*G06F 7/00* (2006.01)
(52) U.S. Cl. ........................................ 707/602; 707/798
(58) Field of Classification Search .................. 707/713, 707/718, 719, 999.003, 602
See application file for complete search history.

(56) References Cited

U.S. PATENT DOCUMENTS

| 4,813,013 | A | 3/1989 | Dunn |
| 4,901,221 | A | 2/1990 | Kodosky et al. |
| 5,379,423 | A | 1/1995 | Mutoh et al. |
| 5,497,500 | A | 3/1996 | Rogers et al. |
| 5,577,253 | A | 11/1996 | Blickstein |
| 5,586,328 | A | 12/1996 | Caron et al. |
| 5,729,746 | A | 3/1998 | Leonard |
| 5,758,160 | A | 5/1998 | McInerney et al. |
| 5,850,548 | A | 12/1998 | Williams |
| 5,857,180 | A | 1/1999 | Hallmark et al. |
| 5,920,721 | A | 7/1999 | Hunter et al. |
| 5,940,593 | A | 8/1999 | House et al. |
| 5,966,532 | A | 10/1999 | McDonald et al. |
| 6,014,670 | A | 1/2000 | Zamanian et al. |
| 6,044,217 | A | 3/2000 | Brealey et al. |
| 6,098,153 | A | 8/2000 | Fuld et al. |
| 6,202,043 | B1 | 3/2001 | Devoino et al. |
| 6,208,345 | B1 | 3/2001 | Sheard et al. |
| 6,208,990 | B1 | 3/2001 | Suresh et al. |
| 6,243,710 | B1 | 6/2001 | DeMichiel et al. |
| 6,282,699 | B1 | 8/2001 | Zhang et al. |
| 6,434,739 | B1 | 8/2002 | Branson et al. |
| 6,449,619 | B1 | 9/2002 | Colliat et al. |
| 6,480,842 | B1 | 11/2002 | Agassi et al. |
| 6,604,110 | B1 | 8/2003 | Savage et al. |
| 6,738,964 | B1 | 5/2004 | Zink et al. |

(Continued)

OTHER PUBLICATIONS

Laura M. Haas et al., Clio Grows Up: From Research Prototype to Industrial Tool, SIGMOD, Jun. 14-16, 2005, 6 pages, Baltimore, Maryland, US.

(Continued)

*Primary Examiner* — Angela Lie
(74) *Attorney, Agent, or Firm* — Patterson & Sheridan, LLP (57) ABSTRACT

Methods and systems for implementing a splitter operation in an extract, transform, and load (ETL) process are provided. In one implementation, the method includes receiving a data flow including a splitter operation, and generating an execution plan graph based on the data flow. The execution plan graph includes structured query language (SQL) code for implementing the splitter operation, in which the structured query language (SQL) code is respectively executable among database servers associated with different vendors.

18 Claims, 6 Drawing Sheets

U.S. PATENT DOCUMENTS

| | | | |
|---|---|---|---|
| 6,772,409 B1 | 8/2004 | Chawla et al. | |
| 6,795,790 B1 | 9/2004 | Lang et al. | |
| 6,807,651 B2 | 10/2004 | Saluja et al. | |
| 6,839,724 B2 | 1/2005 | Manchanda et al. | |
| 6,850,925 B2 | 2/2005 | Chaudhuri et al. | |
| 6,928,431 B2 | 8/2005 | Dettinger et al. | |
| 6,968,326 B2 | 11/2005 | Johnson et al. | |
| 6,968,335 B2 | 11/2005 | Bayliss et al. | |
| 6,978,270 B1 | 12/2005 | Carty et al. | |
| 7,003,560 B1 | 2/2006 | Mullen et al. | |
| 7,010,779 B2 | 3/2006 | Rubin et al. | |
| 7,031,987 B2 | 4/2006 | Mukkamalla et al. | |
| 7,035,786 B1 | 4/2006 | Abu El Ata et al. | |
| 7,076,765 B1 | 7/2006 | Omori | |
| 7,103,590 B1* | 9/2006 | Murthy et al. | 1/1 |
| 7,191,183 B1 | 3/2007 | Goldstein | |
| 7,209,925 B2* | 4/2007 | Srinivasan et al. | 707/602 |
| 7,340,718 B2 | 3/2008 | Szladovics et al. | |
| 7,343,585 B1 | 3/2008 | Lau et al. | |
| 7,499,917 B2* | 3/2009 | Purcell et al. | 1/1 |
| 7,526,468 B2 | 4/2009 | Vincent et al. | |
| 7,689,582 B2 | 3/2010 | Behnen et al. | |
| 7,739,267 B2 | 6/2010 | Jin et al. | |
| 7,747,563 B2 | 6/2010 | Gehring | |
| 2002/0046301 A1 | 4/2002 | Shannon et al. | |
| 2002/0078262 A1 | 6/2002 | Harrison et al. | |
| 2002/0116376 A1* | 8/2002 | Iwata et al. | 707/3 |
| 2002/0170035 A1 | 11/2002 | Casati et al. | |
| 2002/0198872 A1 | 12/2002 | MacNicol et al. | |
| 2003/0033437 A1 | 2/2003 | Fischer et al. | |
| 2003/0037322 A1 | 2/2003 | Kodesky et al. | |
| 2003/0051226 A1 | 3/2003 | Zimmer et al. | |
| 2003/0101098 A1 | 5/2003 | Schaarschmidt | |
| 2003/0110470 A1 | 6/2003 | Hanson et al. | |
| 2003/0149556 A1 | 8/2003 | Riess | |
| 2003/0154274 A1 | 8/2003 | Nakamura | |
| 2003/0172059 A1* | 9/2003 | Andrei | 707/3 |
| 2003/0182651 A1 | 9/2003 | Secrist et al. | |
| 2003/0229639 A1 | 12/2003 | Carlson et al. | |
| 2003/0233374 A1 | 12/2003 | Spinola et al. | |
| 2003/0236788 A1 | 12/2003 | Kanellos et al. | |
| 2004/0054684 A1 | 3/2004 | Geels | |
| 2004/0068479 A1 | 4/2004 | Wolfson et al. | |
| 2004/0107414 A1 | 6/2004 | Bronicki et al. | |
| 2004/0220923 A1 | 11/2004 | Nica | |
| 2004/0254948 A1* | 12/2004 | Yao | 707/101 |
| 2005/0022157 A1 | 1/2005 | Brendle et al. | |
| 2005/0044527 A1 | 2/2005 | Recinto | |
| 2005/0055257 A1 | 3/2005 | Senturk et al. | |
| 2005/0066283 A1 | 3/2005 | Kanamaru | |
| 2005/0091664 A1 | 4/2005 | Cook et al. | |
| 2005/0097103 A1* | 5/2005 | Zane et al. | 707/6 |
| 2005/0108209 A1 | 5/2005 | Beyer et al. | |
| 2005/0131881 A1 | 6/2005 | Ghosh et al. | |
| 2005/0137852 A1 | 6/2005 | Chari et al. | |
| 2005/0149914 A1 | 7/2005 | Krapf et al. | |
| 2005/0174988 A1 | 8/2005 | Bieber et al. | |
| 2005/0188353 A1 | 8/2005 | Hasson et al. | |
| 2005/0216497 A1* | 9/2005 | Kruse et al. | 707/101 |
| 2005/0227216 A1 | 10/2005 | Gupta | |
| 2005/0234969 A1 | 10/2005 | Mamou et al. | |
| 2005/0240354 A1 | 10/2005 | Mamou et al. | |
| 2005/0240652 A1 | 10/2005 | Crick | |
| 2005/0243604 A1 | 11/2005 | Harken et al. | |
| 2005/0256892 A1 | 11/2005 | Harken | |
| 2005/0283473 A1 | 12/2005 | Rousso et al. | |
| 2006/0004863 A1 | 1/2006 | Chan et al. | |
| 2006/0015380 A1 | 1/2006 | Flinn et al. | |
| 2006/0036522 A1 | 2/2006 | Perham | |
| 2006/0047709 A1 | 3/2006 | Belin et al. | |
| 2006/0074621 A1 | 4/2006 | Rachman | |
| 2006/0074730 A1 | 4/2006 | Shukla et al. | |
| 2006/0101011 A1 | 5/2006 | Lindsay et al. | |
| 2006/0112109 A1 | 5/2006 | Chowdhary et al. | |
| 2006/0123067 A1 | 6/2006 | Ghattu et al. | |
| 2006/0167865 A1* | 7/2006 | Andrei | 707/4 |
| 2006/0174225 A1 | 8/2006 | Bennett et al. | |
| 2006/0206869 A1 | 9/2006 | Lewis et al. | |
| 2006/0212475 A1 | 9/2006 | Cheng | |
| 2006/0218123 A1* | 9/2006 | Chowdhuri et al. | 707/2 |
| 2006/0228654 A1 | 10/2006 | Sanjar et al. | |
| 2007/0061305 A1* | 3/2007 | Azizi | 707/3 |
| 2007/0078812 A1 | 4/2007 | Waingold et al. | |
| 2007/0157191 A1 | 7/2007 | Seeger et al. | |
| 2007/0169040 A1 | 7/2007 | Chen | |
| 2007/0203893 A1* | 8/2007 | Krinsky et al. | 707/3 |
| 2007/0208721 A1 | 9/2007 | Zaman et al. | |
| 2007/0214111 A1 | 9/2007 | Jin et al. | |
| 2007/0214171 A1 | 9/2007 | Behnen et al. | |
| 2007/0244876 A1 | 10/2007 | Jin et al. | |
| 2008/0092112 A1 | 4/2008 | Jin et al. | |
| 2008/0147703 A1 | 6/2008 | Behnen et al. | |

OTHER PUBLICATIONS

John R. Friedrich, II, Meta-Data Version and Configuration Management in Multi-Vendor Environments, SIGMOD, Jun. 14-16, 2005, 6 pages, Baltimore, Maryland, US.

Rami Rifaieh et al., Query-based Data Warehousing Tool, DOLAP, Nov. 8, 2002, 8 pages, McLean, Virginia, US.

Meikel Poess, et al., TPC-DS, Taking Decision Support Benchmarking to the Next Level, ACM SIGMOD, Jun. 4-6, 2002, 6 pages, Madison, Wisconsin, US.

Method and System for Generating Data Flow Execution Components in Heterogeneous Data Integration Environments, U.S. Appl. No. 11/372,540, filed Mar. 10, 2006.

Dilation of Sub-Flow Operations in a Data Flow, U.S. Appl. No. 11/372,516, filed Mar. 10, 2006.

Classification and Sequencing of Mixed Data Flows, U.S. Appl. No. 11/373,084, filed Mar. 10, 2006.

Data Flow System and Method for Heterogeneous Data Integration Environments, U.S. Appl. No. 11/373,685, filed Mar. 10, 2006.

Hernandez et al., Clio: A Schema Mapping Tool for Information Integration, IEEE Computer Society, 2005.

Carreira et al., Execution of Data Mappers.

Arusinski et al., "A Software Port from a Standalone Communications Management Unit to an Integrated Platform", 2002, IEEE, pp. 1-9.

Carreira et al, "Data Mapper: An Operator for Expressing One-to Many Data Transformations", Data Warehousing and Knowledge Discovery, Tjoa et al, editors, $7^{th}$ International Conference DaWaK 2005 Copenhagen, Denmark, Aug. 22-26, 2005, pp. 136-145.

Ferguson et al., "Platform Independent Translations for a Compilable Ada Abstract Syntax", Feb. 1993 ACM 0-89791-621-2/93/0009-0312 1.50, pp. 312-322.

Gurd et al., "The Manchester Prototype Dataflow Computer", Communications of the ACM, Jan. 1985, pp. 34-52, vol. 28, No. 1.

Jardim-Gonçalves et al., "Integration and adoptability of APs: the role of ISO TC184/SC4 standards", International Journal of Computer Applications in Technology, 2003, pp. 105-116, vol. 18, Nos. 1-4.

Ramu, "Method for Initializing a Plateform and Code Independent Library", IBM Technical Disclosure Bulletin, Sep. 1994, pp. 637-638, vol. 37, No. 9.

Simitsis, "Mapping Conceptual to Logical Models for ETL Processes", ACM Digital Library, 2005, pp. 67-76.

Stewart et al., "Dynamic Applications from the Ground Up", Haskell '05, Sep. 30, 2005, Tallinn, Estonia, ACM, pp. 27-38.

Vassiliadis et al., "A generic and customizable framework for the design of ETL scenarios", Information Systems, Databases: Creation, Management and Utilization, 2005, pp. 492-525, vol. 30, No. 7.

Werner et al., "Just-in-sequence material supply—a simulation based solution in electronics", Robotics and Computer-Integrated Manufacturing, 2003, pp. 107-111, vol. 19, Nos. 1-2.

Yu, "Transform Merging of ETL Data Flow Plan", IKE '03 International Conference, 2003, pp. 193-198.

Zhao et al., "Automated Glue/Wrapper Code Generation in Integration of Distributed and Heterogeneous Software Components", Proceedings of the $8^{th}$ IEEE International Enterprise Distributed Object Computing Conf. (EDOC 2004), 2004, IEEE, pp. 1-11.

Method and Apparatus for Modelling Data Exchange in a Data Flow of an Extract, Transform, and Load (ETL) Process, U.S. Appl. No. 11/621,521, filed Jan. 9, 2007.

Tjoa, et al. (Eds.), "Data Warehousing and Knowledge Discovery—Data Mapper: An Operator for Expressing One-to-Many Data Transformations," Proceedings of 7th International Conference, DaWaK 2005, Copenhagen, Denmark, Aug. 22-26, 2005, 11 pages.

Konstantinides, et al., "The Khoros Software Development Environment for Image and Signal Processing," May 1994, IEEE, vol. 3, pp. 243-252.

Method and Apparatus for Adapting Application Front-Ends to Execute on Heterogeneous Device Platforms, U.S. Appl. No. 09/707,504, filed Nov. 7, 2000.

Office Action History of pending U.S. Appl. No. 11/621,521, dated Sep. 28, 2010.

Office Action History of patented U.S. Appl. No. 11/373,084, dates ranging from Feb. 20, 2009 to Feb. 3, 2010.

Office Action History of pending U.S. Appl. No. 11/372,540, dates ranging from Mar. 11, 2009 to Nov. 12, 2009.

Office Action History of patented U.S. Appl. No. 11/373,685, dates ranging from Jan. 10, 2008 to Nov. 16, 2009.

Office Action History of pending U.S. Appl. No. 11/548,632, dates ranging from May 11, 2010 to Oct. 27, 2010.

Office Action History of pending U.S. Appl. No. 11/548,659, dated Nov. 10, 2010.

Office Action History of patented U.S. Appl. No. 11/372,516, dates ranging from Apr. 17, 2008 to Nov. 17, 2009.

Arkusinski et al., "A Software Port from a Standalone Communications Management Unit to an Integrated Platform" Digital Avionics Systems Conference, Oct. 27-31, 2002, pp. 6B3-1-6B3-9, vol. 1, IEEE, Irvine, CA, US.

Carreira et al., "Data Mapper: An Operator for Expressing One-to Many Data Transformations", Data Warehousing and Knowledge Discovery, 7th International Conference, Aug. 22-26, 2005, pp. 136-145, Copenhagen, Denmark.

Ferguson et al., "Platform Independent Translations for a Compilable Ada Abstract Syntax", Proceedings of the Conference on TRI-Ada '93, Feb. 1993, pp. 312-322, New York, NY, US.

Gurd et al., "The Manchester Prototype Dataflow Computer", Communications of the ACM—Special section on computer architecture, Jan. 1985, pp. 34-52, vol. 28, Issue 1, New York, NY, US.

Jardim-Goncalves et al., "Integration and adoptability of APs: the role of ISO TC184/SC4 standards", International Journal of Computer Applications in Technology, 2003, pp. 105-116, vol. 18, Nos. 1-4, Inderscience Publishers, Geneva, Switzerland.

Ramu et al., "Method for Initializing a Plateform and Code Independent Library", IBM Technical Disclosure Bulletin, Sep. 1, 1994, pp. 637-638, vol. 37, No. 9, US.

Simitsis, "Mapping Conceptual to Logical Models for ETL Processes", DOLAP '05: Proceedings of the 8th ACM International Workshop on Data Warehousing and OLAP, 2005, pp. 67-76, New York, NY, US.

Stewart et al., "Dynamic Applications from the Ground Up", Haskell '05: Proceedings of the 2005 ACM SIGPLAN workshop on Haskell, Sep. 30, 2005, Tallinn, Estonia, ACM Digital Library, pp. 27-38, New York, NY, US.

Vassiliadis et al., "A generic and customizable framework for the design of ETL scenarios", Information Systems—Special Issue: The 15th international conference on advanced information systems engineering, Nov. 2005, pp. 492-525, vol. 30, Issue 7, Elsevier Science Ltd., Oxford, United Kingdom.

Werner et al., "Just-in-sequence material supply—a simulation based solution in electronics", Robotics and Computer-Integrated Manufacturing, 2003, pp. 107-111, vol. 19, Nos. 1-2, Elsevier Science Ltd., Oxford, United Kingdom.

Zhao et al., "Automated Glue/Wrapper Code Generation in Integration of Distributed and Heterogeneous Software Components", EDOC '04: Proceedings of the Enterprise Distributed Object Computing Conference, Eighth IEEE International, 2004, pp. 275-285, IEEE Computer Society, Washington, DC, US.

Friedrich, John R., "Meta-Data Version and Configuration Management in Multi-Vendor Environments", SIGMOD '05: Proceedings of the 2005 ACM SIGMOD International, Jun. 14-16, 2005, pp. 799-804, New York, NY, US.

Rifaieh et al., "Query-based Data Warehousing Tool", DOLAP '02: Proceedings of the 5th ACM International Workshop on Data Ware and OLAP, 2002, pp. 35-42, New York, NY, US.

Poess, et al., "TPC-DS, Taking Decision Support Benchmarking to the Next Level", SIGMOD '02: Proceedings of the 2002 ACM SIGMOD International Conference on Management Data, Jun. 4-6, 2002, pp. 582-587, New York, NY, US.

Carreira, et al., "Execution of Data Mappers", IQIS '04: Proceedings of the 2004 international workshop on Information quality in information systems, 2004, pp. 2-9, New York, NY, US.

Konstantinides, et al., "The Khoros Software Development Environment for Image and Signal Processing", Image Processing, IEEE Transaction on Image Processing, May 1994, vol. 3, Issue 3, pp. 243-252.

Yu, Tsae-Feng, "Transform Merging of ETL Data Flow Plan", IKE '03 International Conference, 2003, pp. 193-198, Las Vegas, NV, US.

Hernandez, et al., "Clio: A Schema Mapping Tool for Information Integration", ISPAN '05: Proceedings of the 8th International Symposium on Parallel Architectures, Alogrithms and Networks, 2005, p. 11, IEEE Computer Society, Washington, DC, US.

Ives et al., "An Adaptive Query Execution System for Data Integration", SIGMOD '99: Proceedings of the 1999 ACM SIGMOD International Conference on Management of Data, Jun. 1999, vol. 28, Issue 2, pp. 299-310, New York, NY, US.

Simitsis, Alkis, Mapping Conceptual to Logical Models for ETL Processes, Proceedings of the 8th ACM international workshop on Data warehousing and OLAP, 2005, pp. 67-76, ACM, New York, New York, United States.

Ives, Zachary G. et al., An Adaptive Query Execution System for Data Integration, Proceedings of the 1999 ACM Sigmod international conference on Management of data, Jun. 1999, pp. 299-310, vol. 28, Issue 2, ACM, New York, New York, United States.

Konstantinides, Konstantinos et al., The Khoros Software Development Environment for Image and Signal Processing, IEEE Transactions of Image Processing, May 1994, pp. 243-252, vol. 3, Issue 3, IEEE, Piscataway, New Jersey, United States.

* cited by examiner

METHOD AND APPARATUS FOR USING SET BASED STRUCTURED QUERY LANGUAGE (SQL) TO IMPLEMENT EXTRACT, TRANSFORM, AND LOAD (ETL) SPLITTER OPERATION

CROSS-REFERENCE TO RELATED APPLICATIONS

This application is related to U.S. Patent Application entitled "System and Method for Generating Code for an Integrated Data System," Ser. No. 11/372,540, filed on Mar. 10, 2006, U.S. Patent Application entitled "Data Flow System and Method for Heterogeneous Data Integration Environments," Ser. No. 11/373,685, filed on Mar. 10, 2006, U.S. Patent Application entitled "Dilation of Sub-Flow Operators in a Data Flow," Ser. No. 11/372,516, filed on Mar. 10, 2006, U.S. Patent Application entitled "Classification and Sequencing of Mixed Data Flows," Ser. No. 11/373,084, filed on Mar. 10, 2006, U.S. Patent Application entitled "Methods and Apparatus for Managing Application Parameters," Ser. No. 11/548,632, filed on Oct. 11, 2006, and U.S. Patent Application entitled "Method and Apparatus for Generating Code for an Extract, Transform, and Load (ETL) Data Flow," Ser. No. 11/548,659, filed on Oct. 11, 2006, the disclosures of which are incorporated by reference herein.

FIELD OF THE INVENTION

The present invention relates generally to data processing, and more particularly to implementing a splitter operation in an extract, transform, the load (ETL) process.

BACKGROUND OF THE INVENTION

Extract, transform, and load (ETL) is a process in data warehousing that involves extracting data from outside sources, transforming the data in accordance with particular business needs, and loading the data into a data warehouse. An ETL process typically begins with a user defining a data flow that defines data transformation activities that extract data from, e.g., flat files or relational tables, transform the data, and load the data into a data warehouse, data mart, or staging table. A common operation defined in a data flow is a splitter operation. A splitter operation produces multiple output data sets from a single input data set, according to specified (Boolean) conditions. Each output data set can then be further transformed prior to being loaded into a data target table.

The implementation of a conventional splitter operation by ETL vendors can be generalized into two categories. The first category of splitter operations includes those associated with ETL vendors that implement a proprietary ETL engine (e.g., Information or IBM DataStage Server), in which splitter operations are handled by an ETL engine. The second category of splitter operations includes those associated with ETL vendors that use a database server for ETL processing (e.g., Oracle Warehouse Builder (OWB) or Microsoft SQL server), in which splitter operations are either handled by a database server using row based structured query language procedural language (SQL/PL), or a combination of SQL and PL. A splitter operation can be implemented with proprietary SQL statements (Oracle uses, for example, multiple table insert statements to insert multiple outputs from a splitter operation into multiple target tables). An advantage of using procedural language to handle a splitter operation is that procedural code can handle complex row based data transformations—e.g., input data can be examined row by row and complex conditions can be applied (as well as column level transformations) to each row prior to routing the data to a target table.

There are, however, a few drawbacks associated with using procedural language and row based processing to implement a splitter operation. For example, the SQL/PL code generated by OWB generally cannot run on other types of database servers without among different vendors. Also, although row based processing provides for the application of complex conditions and column level transformations to each input row, row based processing is not always efficient, especially when there are a large number of rows to process for a given ETL process.

BRIEF SUMMARY OF THE INVENTION

In general, in one aspect, this specification describes a computer-implemented method for generating code corresponding to a splitter operation in an extract, transform, and load (ETL) process. The method includes receiving a data flow including a splitter operation, and generating an execution plan graph based on the data flow. The execution plan graph includes structured query language (SQL) code for implementing the splitter operation, in which the structured query language (SQL) code is respectively executable among database servers associated with different vendors.

Particular implementations can include one or more of the following advantages. In one implementation, a code generation system is described that can generate standard SQL (92/99) code, which can be executed on any database engine. In addition, the code generation system can generate database vendor specific code that can leverage vendor specific SQL optimizations. Also, in one aspect, a splitter operation is implemented using set based SQL which generally provides a better performance compared to row based processing, especially when a large number of rows need to be processed in a given ETL process.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF THE INVENTION

The present invention relates generally to data processing, and more particularly to implementing a splitter operation in an extract, transform, and load (ETL) process. The following description is presented to enable one or ordinary skill in the art to make and use the invention and is provided in the context of a patent application and its requirements. The present invention is not intended to be limited to the implementations shown but is to be accorded the widest scope consistent with the principles and features described herein.

Figure 1:
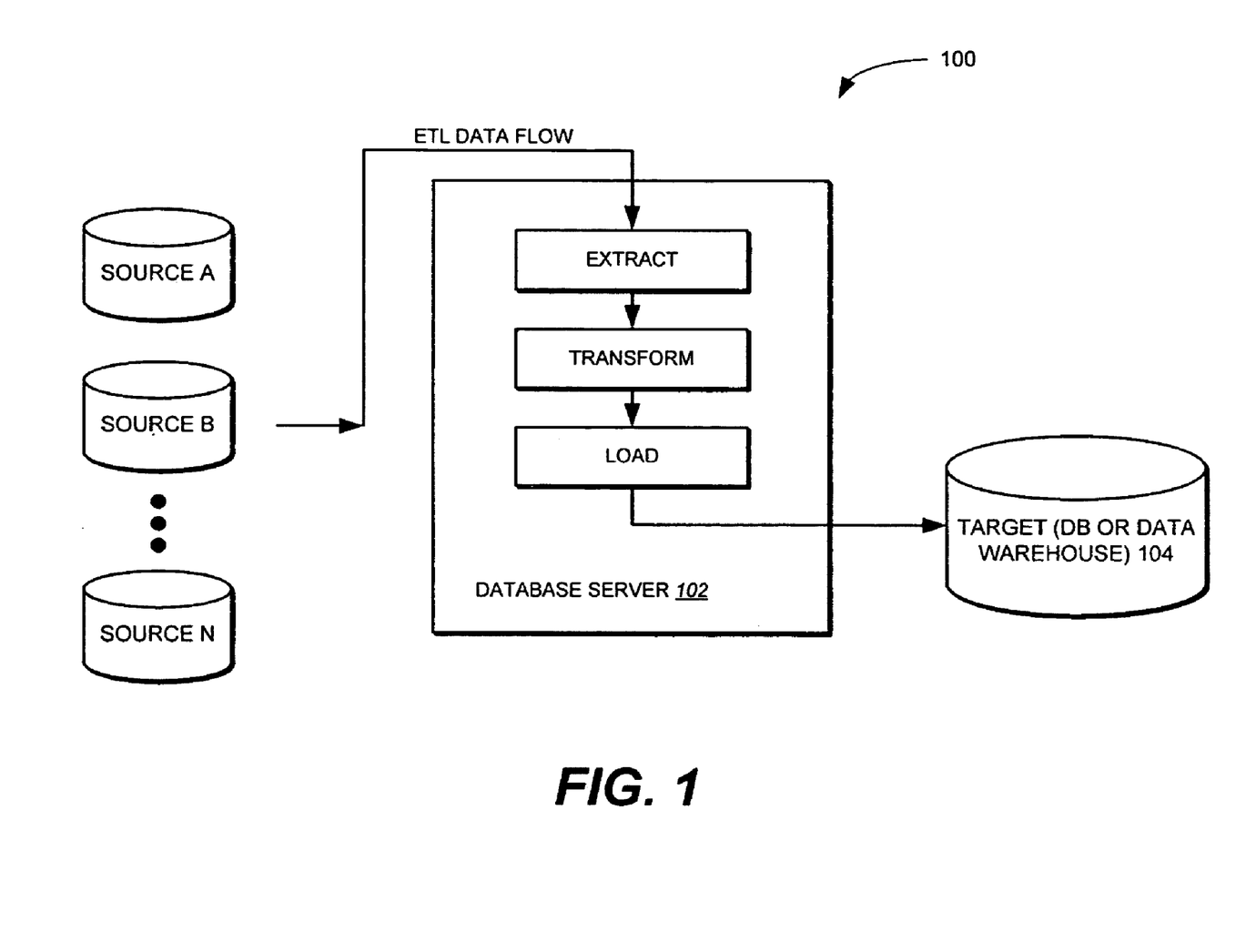
FIG. 1 illustrates an extract, transform, and load (ETL) system in accordance with one implementation of the invention.

FIG. 1 illustrates an extract, transform, and load (ETL) system 100 according to one implementation. The ETL system 100 includes a database server 102 that acts as an ETL engine to integrate data (e.g., from data sources A, B, . . . N) through an extract phase, a transform phase, and a load phase. The extract phase includes extracting data from source systems (e.g., from data sources A, B, . . . N). Most data warehousing projects consolidate data from different source systems. Each separate source system may also use a different data organization/format. Common data source formats include, for example, relational databases and flat files, and include non-relational database structures such as IMS. The extract phases includes converting the data into a format for transformation processing. The transform phase applies a series of rules or functions to the extracted data to derive the data to be loaded. The load phase loads the data into a data warehouse (e.g., data warehouse 104). Data integration typically begins with a user describing a data flow of an ETL process using a UI (user interface) tool. A data flow represents a logical transformation and flow of data. A code generation system generates code from the data flow, which generated code is then sent to the database server 102 for execution.

Figure 2:
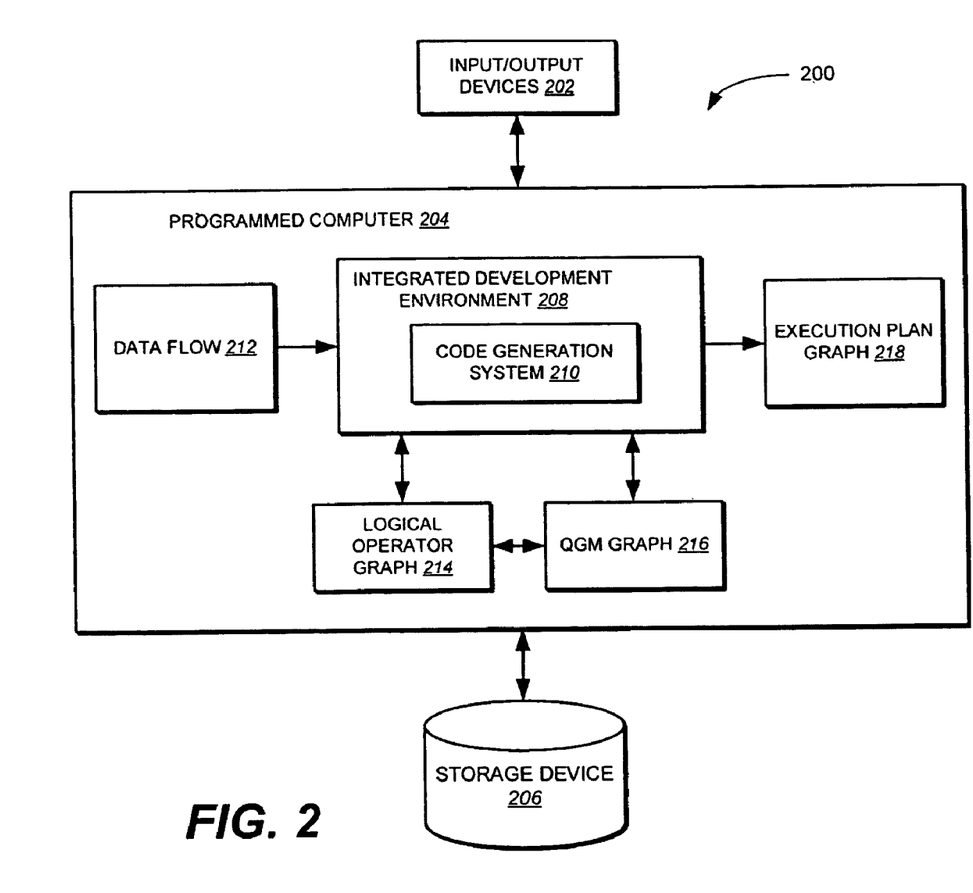
FIG. 2 is a block diagram of a data processing system including a code generation system in accordance with one implementation of the invention.

FIG. 2 illustrates a data processing system 200 in accordance with one implementation of the invention. The data processing system 200 can comprise the IBM DB2 Data Warehouse Edition (DWE) product available from International Business Machines Corporation of Armonk, N.Y. Data processing system 200 includes input and output devices 202, a programmed computer 204, and a storage device 206. Input and output devices 202 can include devices such as a printer, a keyboard, a mouse, a digitizing pen, a display, a printer, and the like. Programmed computer 204 can be any type of computer system, including for example, a workstation, a desktop computer, a laptop computer, a personal digital assistant (PDA), a cell phone, a network, and so on.

Running on the programmed computer 204 is an integrated development environment 208. The integrated development environment 208 is a software component the assists users (e.g., computer programmers) in developing, creating, editing, and managing code for target platforms.

In one implementation, the integrated development environment 208 includes code generation system 210 that (in one implementation) is operable to generate standard set based structured query language (SQL) (e.g., SQL 92/99 code) to implement a splitter operation, as discussed in greater detail below. Thus, unlike a conventional code generation system that may generate row based SQL/PL (or a combination of SQL and PL) that is vendor specific, the code generation system 210 is operable to generate standard set based SQL that may run on database servers available from different vendors without having to be rewritten or ported. Vendors that provide a database service include, for example, IBM Corporations—DB2 UDB (universal database), Oracle Corporation—Oracle database, Microsoft, Inc.—Microsoft SQL server, Sybase—Sybase database server, and so on. In general, set based SQL processing provides better performance compared to row based processing. In one implementation, the code generator 210 can also generate database vendor specific code that can leverage vendor specific SQL optimizations. In one implementation, the code generator 210 generates standard set based SQL or database vendor specific code using techniques as described in U.S. Patent Application entitled "Classification and Sequencing of Mixed Data Flows," Ser. No. 11/372,540, filed on Mar. 10, 2006, which is incorporated by reference in its entirety.

In operation, a data flow 212 (e.g., an ETL data flow) is received by the code generation system 210, and the data flow 212 is converted by the code generation system into a logical operator graph (LOG) 214. The logical operator graph 214 is a normalized, minimalist representation of the data flow 212 that includes logical abstract collection of operators (including, e.g., one or more of a splitter operator, join operator, filter operator, table extract operator, bulk load operator, aggregate operator, and so on). In some implementations, all of the contents of the data flow 212 may be used "as-is" by the code generation system 210 and, therefore, the logical operator graph 214 will be the same as the data flow 212. The code generation system 210 converts the logical operator graph 214 into a query graph model (QGM graph) 216. The QGM graph 216 is an internal data model used by the code generation system 210 for analysis and optimization processes, such as execution parallelism (in which disparate sets of operations within a data flow are grouped and executed in parallel to yield better performance). After analysis, the QGM 216 is converted into an extended plan graph 218. The extended plan graph 218 represents the code generated by the code generation system 210 and is sent to a runtime engine (e.g., an ETL engine) for execution. In one implementation, the extended plan graph 218 includes standard set based SQL for implementing a splitter operation. In another implementation, the extended plan graph 218 includes database vendor specific code for implementing a splitter operation.

Figure 3:
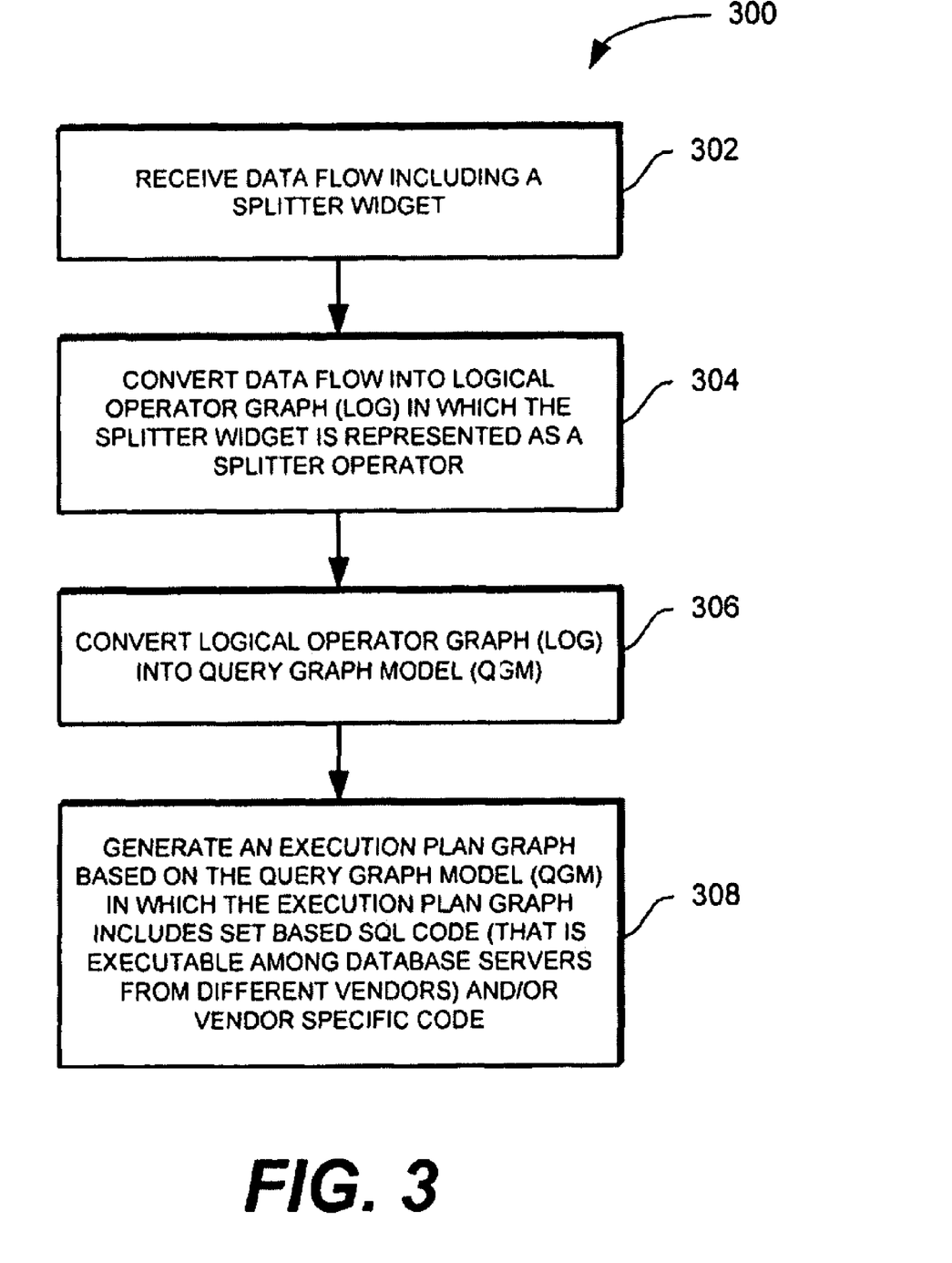
FIG. 3 is a flow diagram of a method for generating code to implement a splitter operation in accordance with one implementation of the invention.

FIG. 3 is a flow diagram illustrating a computer-implemented method 300 for generating code to implement a splitter operation in a data flow (e.g., data flow 212) in accordance with one implementation of the invention. The method 300 begins with a code generation system (e.g., code generation system 210) receiving a data flow (step 302). A data flow represents a logical transformation and flow of data, and is typically built based on user input. For example, versions of the IBM DB2 Data Warehouse Edition (DWE) product have a data flow graphical editor that enables users to build data flows. In one implementation, the data flow includes a splitter widget that represents a splitter operation. The data flow is converted to a logical operator graph (LOG) (e.g., logical operator graph 214) by a code generation system (e.g., code generation system 210) (step 304). In one implementation, the splitter widget associated with the data flow is represented as a (LOG) splitter operator in the logical operator graph. Other types of operators can be respected in the logical operator graph including, for example, a join operator, a filter operator, a table extract operator, a bulk load operator, an aggregate operator, and so on.

The logical operator graph is converted (e.g., by code generation system 210) into a query graph model (QGM) (e.g., QGM graph 216) (step 306). As discussed above, the query graph model is an internal data structure used by the code generation system for analysis and optimization purposes. An execution plan graph (e.g., execution plan graph 218) is generated (e.g., by code generation system 210) based on the query graph model (step 308). In one implementation, the execution plan graph includes standard set based SQL for implementing the splitter operator within the logical operator graph. In such an implementation, the standard set based SQL code associated with the splitter operation can be run on database engines (or database servers) that are available from different vendors. In another implementation, the extended plan graph 218 includes database vendor specific code for implementing the splitter operator within the logical operator graph.

EXAMPLE

Figure 4:
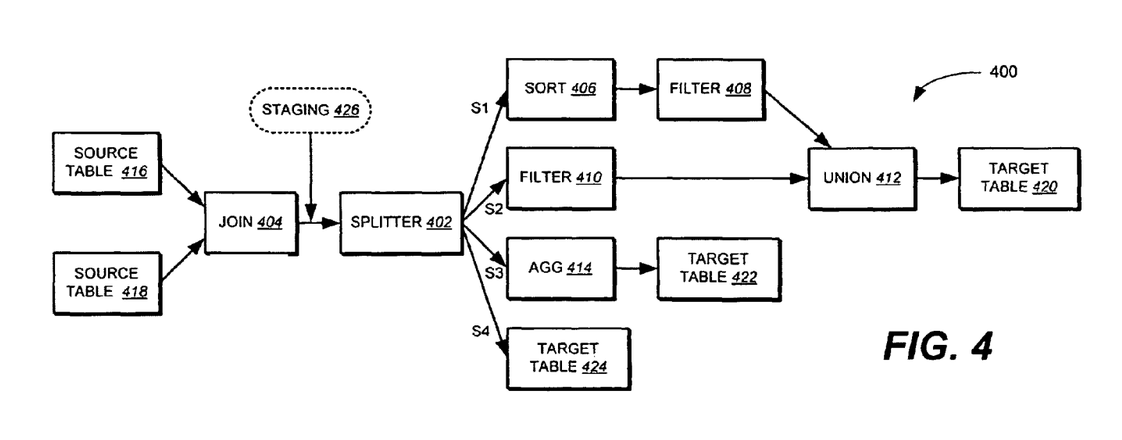
FIG. 4 is a diagram of an example logical operator graph including a splitter operator in accordance with one implementation of the invention.

FIG. 4 illustrates an example logical operator graph 400 including a splitter operator 402 (that splits data from one source to multiple targets) in accordance with one implementation of the invention. The logical operator graph 400 also includes a join operator 404, a sort operator 406, filter operators 408, 410, a union operator 412, and an aggregate operator (agg) 414. The logical operator graph 400 further includes source tables 416, 418, and target tables 420, 422, 424.

As shown in FIG. 4, rows of source tables 416, 418 are extracted and joined (through the join operator 404) prior to being sent to the splitter operator 402. In one implementation, the splitter operator 402 receives a single input row set and produces multiple row sets using Boolean conditions—i.e., the splitter operator 402 routes the incoming rows (output from the join operator 404) into four outputs based on the four Boolean conditions S1-S4. In one implementation, a split (Boolean) condition is a valid SQL expression that can be used in a WHERE clause. In one implementation, a row set comprise multiple rows. Thus, the splitter operator 402 can process multiple rows at a time rather than on a row by row basis as is performed in conventional techniques. Each output row set from the splitter operator 402 can be inserted directly into a target table (as shown for condition S4), or each output row set an be further transformed through ETL processing (as shown by conditions S1-S3). The output row set corresponding to condition S1 is sorted through the sort operator 406 and filtered through the filter operator 408. The output row set corresponding to condition S2 is filtered through the filter operator 410 and unioned with the output of filter 408 through the union operator 412. The data output from the union operator 412 is inserted into, the target table 420. The output row set corresponding to condition S3 is aggregated through the aggregator operator 414, and then inserted into target table 422.

Splitter Operator Presentation and Mapping

Figure 5:
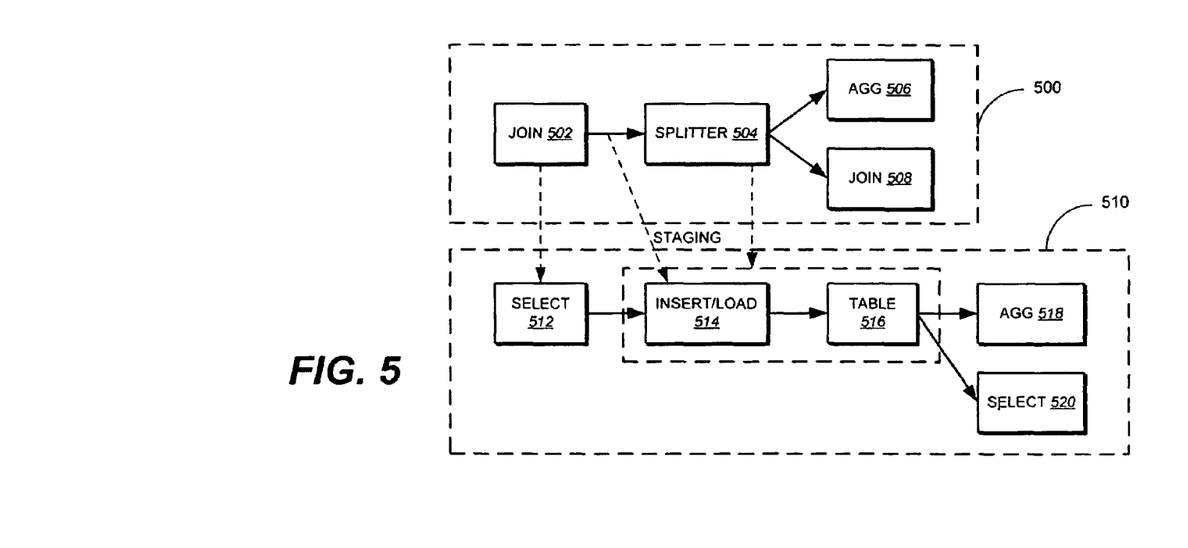
FIG. 5 illustrates an example logical operator graph mapped to a query graph model (QGM) in accordance with one implantation of the invention.

A (LOG) splitter operator (e.g., splitter operator 402) is mapped to multiple query graph model (QGM) boxes and/or predicates that represent splitter conditions. The numbers and types of QGM boxes into which a splitter operator is mapped varies depending upon the location of the splitter operator within a given logical operator graph. For example, FIG. 5 illustrates an example logical operator graph 500 mapped to a query graph model (QGM) 510 in accordance with one implementation of the invention. The mapping of the logical operator graph 500 to the query model (QGM) 510 can be performed by a code generation system (e.g., code generation system 210 of FIG. 2).

The logical operator graph 500 includes a join operator 502, a splitter operator 504, an aggregate operator (agg) 506, and a join operator 508. In general, each operator of the logical operator graph 500 can be mapped directly to a query graph model operator, transformed to a set of table functions and stored procedures, converted directly to a query graph model quantifier, or graphed to a property of a query graph model entity. As shown in FIG. 5, the query graph model (QGM) 510 includes various operators mapped from the logical operator graph 500 including a select node 512, an insert/load operator 514, a table 516, an aggregate operator 518, and a select node 520. In the example of FIG. 5, the (LOG) join operator 502 is converted to a (QGM) select node 512 and a quantifier that represents a predicate (not shown). The (LOG) splitter operator 504 is mapped to the (QGM) insert/load operator 514 and the (QGM) table 516.

Staging and Optimization

A row set input received by a splitter operator can be directly from a source table (e.g., source table 416 or source table 418), or from an output row set of a transform operation. Referring back to the example logical operator graph 400 shown in FIG. 4, the input row set to the splitter operator 402 is received from the output of the join operator 404 (a transform operation). In one implementation, an output row set of a transform operation is placed in a staging table prior to being sent to a splitter operator to avoid the transformation associated with the transform operation from having to be performed multiple times for each output row set of the splitter operator. Thus, for example, as shown in FIG. 4, the input row set to the splitter operator 402 is placed into a staging table (e.g., staging table 426) prior to being sent to the splitter operator 402 (to avoid the transformation associated with the join operator 404 from having to be performed multiple times for each output row set of the splitter operator 402). For each output branch, the splitter operator 402 reads the input row set and applies a corresponding splitter condition. The output branch data set can be further transformed and then placed into a target table, as discussed above.

In one implementation, the code generation system 210 (FIG. 2) loads output row sets from a splitter operator into target tables in accordance with a predetermined order. For example, referring to FIG. 6, a logical operator graph 600 is shown including a dimension table 602, a (target) fact table 604, a key lookup operator 606, a splitter operator 608, and a join operator 610. The splitter operator 608 is used to emulate automatic row generations on the dimension table 602—i.e., rows from a fact source table (not shown) (which are passed through the key lookup operator 606 in order to look up reference keys from the dimension table 602) are split into two output streams. The first output stream contains rows contains rows for which no reference keys exist in the dimension table 602 and so, therefore, new records are inserted into the dimension table 602. The second output stream is the main stream that flows through the join operator 610 with the output from the updated dimension table 602, which is then loaded into the target fact table 604.

Figure 6:
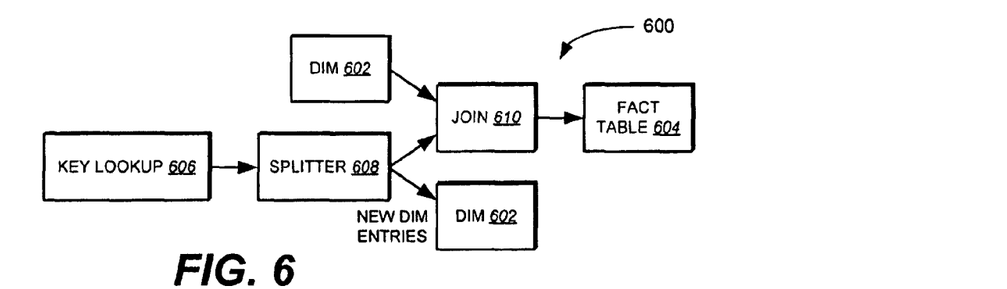
FIG. 6 illustrates an example logical operator graph including a splitter operator in accordance with one implementation of the invention.

In one implementation, to guarantee that referential integrity is being maintained, the new records (new dim entries) inserted into the dimension table 602 must be completed prior to the rows being inserted into the target fact table 604. In one implementation, the data processing system 200 (FIG. 2) permits a user to specify such ordering information so that the code generation system 210 will generate an execution plan in the correct sequence. In one implementation, the code generation system 210 (by default) executes each output branch of splitter operation in sequence in accordance to the position of each branch (e.g., from top to bottom) if no order is specified by a user.

Generally, if there is no convergence of output data of a splitter operator, the transformation and loading for each output branch of the splitter operator can be executed in parallel to gain a performance improvement. However, if there is a convergence, the loading of staging tables prior to the point of convergence can be parallelized.

Code Generation

Figure 7:
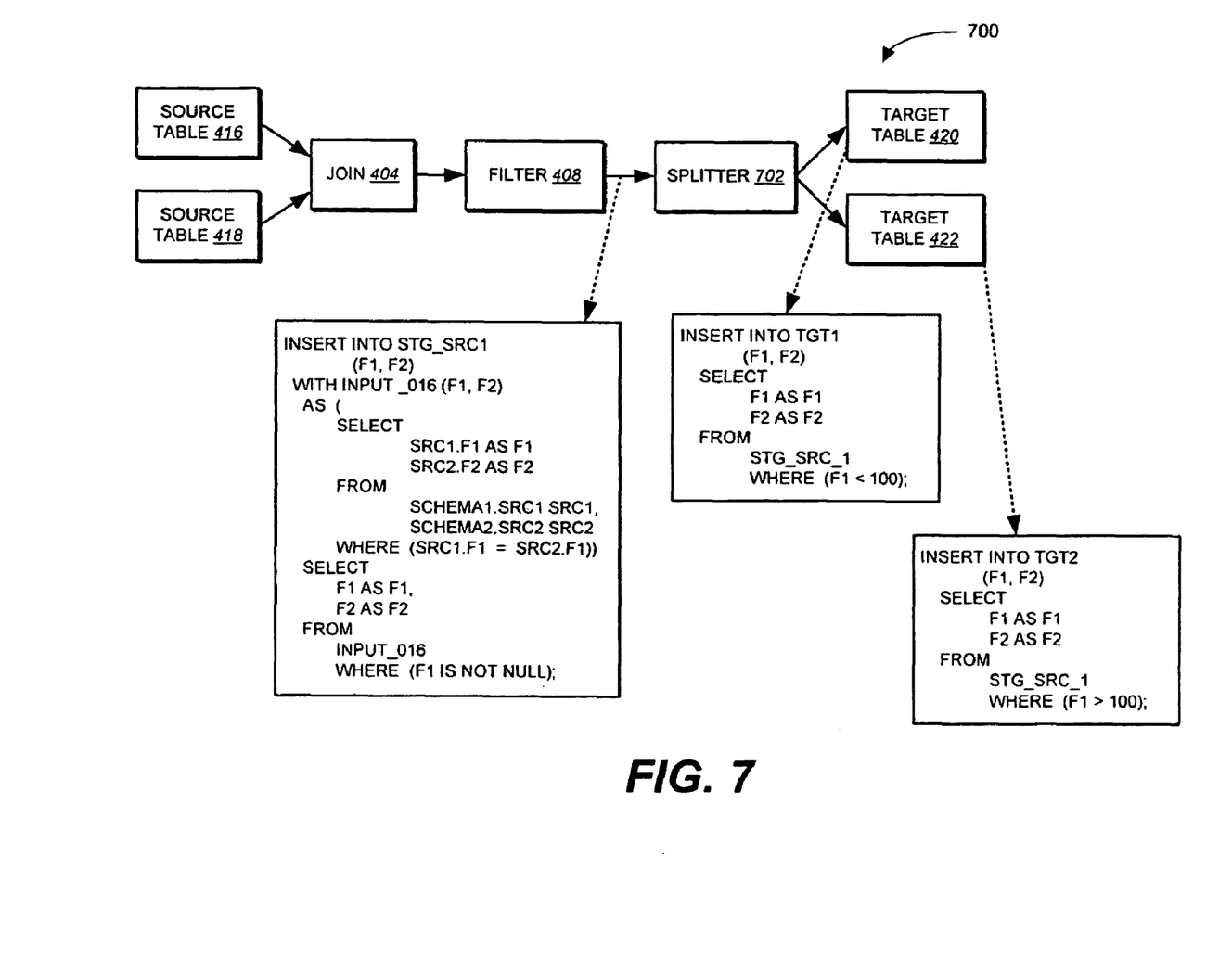
FIG. 7 illustrates example SQL code corresponding to a splitter operation in accordance with one implementation of the invention.

In general, SQL SELECT and INSERT statements are used to implement a splitter operation. In one implementation, INSERT statement are used to stage intermediate data rows into staging tables (relational tables), and SQL SELECT statements are applied for each output data stream of a splitter operation. A split condition can be translated into a WHERE clause of the corresponding SQL SELECT statement. For example, FIG. 7 illustrates and example logical operator graph 700 including example SQL SELECT and INSERT statements corresponding to the splitter operator 702.

Database Vendor Specific Optimization

The performance of an INSERT statement can be slow and cause a bottleneck of a splitter operation if the number of intermediate rows is large. To address this problem, (in one implementation) the code generation system 210 of FIG. 2 leverages database vendor specific high performance SQL capabilities to generate optimal code. For example, if the execution database is DB2, the code generation system 210 can generate SQL statements that use a DB2 global temporary table, common table expression, select over insert, merge statement, and a DB2 loader utility, etc. to achieve better query performance. In the example above, a DB2 global temporary table and a common table expression can be used to stage the input rows of a splitter operation for better performance, as shown by the SQL code below.

```
DECLARE GLOBAL TEMPORARY TABLE SESSION.INPUT_02(
    F1 INTEGER,
    F2 INTEGER)
    NOT LOGGED ON COMMIT PRESERVE ROWS
INSERT INTO SESSION.INPUT_02
    (F1, F2)
    WITH INPUT_016 (F1, F2)
    AS (
    SELECT
        IN_012.F1 AS F1,
        IN_012.F2 AS F2
    FROM
        SCHEMA1.SRC1 IN_012,
        SCHEMA2.SRC2 IN1_012,
    WHERE (IN_012.F1 – IN1_012.F1))
    SELECT
        F1 AS F1,
        F2 AS F2
    FROM
        INPUT_016
    WHERE (F1 IS NOT NULL)
```

Furthermore, if the execution database is an Oracle execution database, the code generation system can generate an Oracle specific high performance SQL statement (such as Oracle's multiple table insert) for optimal performance.

One or more of method steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In one implantation, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can by any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Figure 8:
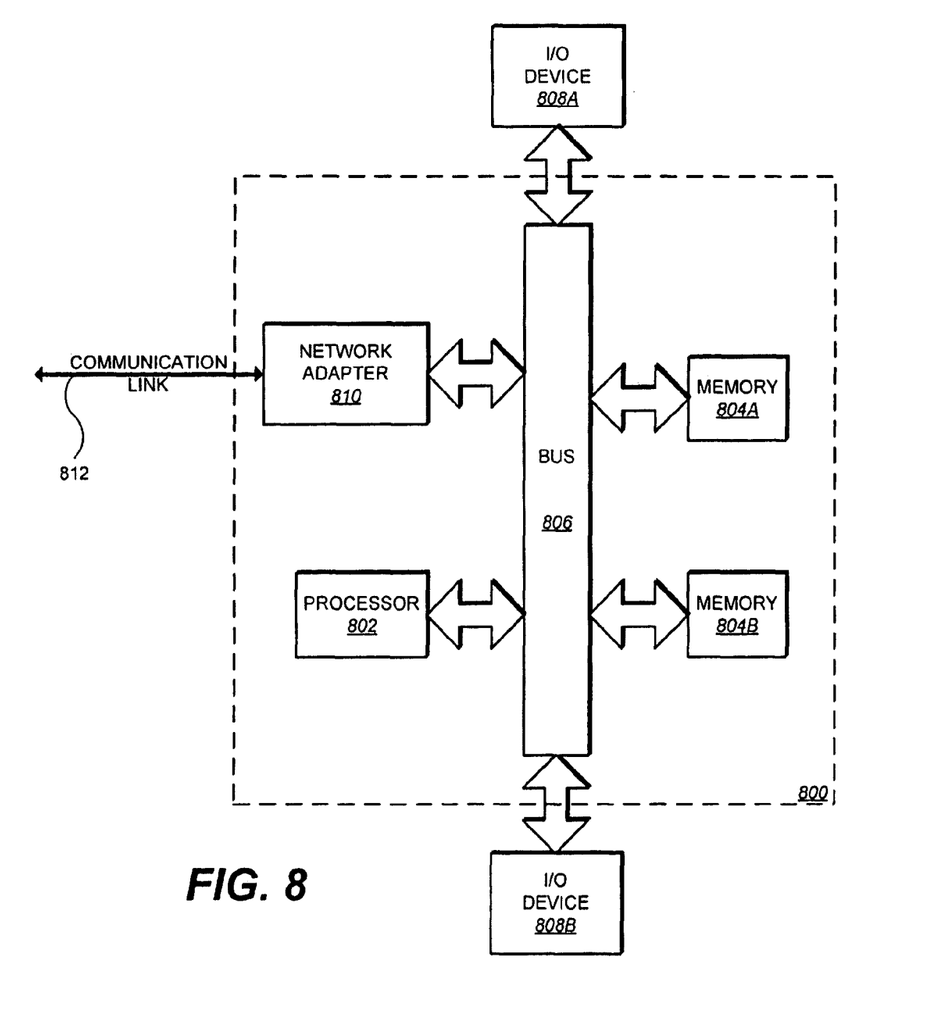
FIG. 8 is a block diagram of a data processing system suitable for storing and/or executing program code in accordance with one implementation of the invention.

FIG. 8 illustrates a data processing system 800 suitable for storing and/or executing program code. Data processing system 800 includes a processor 802 coupled to memory elements 804A-B trough a system bus 806. In other implementations, data processing system 800 may include more than one processor and each processor may be coupled directly or indirectly to one or more memory elements through a system bus.

Memory elements 804A-B can include local memory employed during actual execution of the program code, bulk storage, and cache memories that provide temporary storage of at least some program code in order to reduce the number of times the code must be retrieved from bulk storage during execution. As shown, input/output or I/O devices 808A-B (including, but not limited to, keyboards, displays, pointing devices, etc.) are coupled to data processing system 800. I/O devices 808A-B may be coupled to data processing system 800 directly or indirectly through intervening I/O controllers (not shown).

In one implementation, a network adapter 810 is coupled to data processing system 800 to enable data processing system 800 to become coupled to other data processing systems or remote printers or storage devices through communication link 812. Communication link 812 can be a private or public network. Modems, cable modems, and Ethernet cards are just a few of the currently available types of network adapters.

Various implementations for implementing a splitter operation in an extract, transform, and load (ETL) process have been described. Nevertheless, various modifications may be made to the implementations, and those variations would be within the scope of the present invention. For example, one can take the XML presentation of an ETL flow, directly translate/map it to a query model graph (similar to QGM) that represents the relationships of the operators in the ETL flow, and implement a system that translate the query model graph directly into SQL statement. Accordingly, many modifications may be made without departing from the scope of the following claims.

What is claimed is:

1. A computer-implemented method, comprising:
   receiving a data flow including a splitter operation, the splitter operation comprising an operation in an extract, transform, and load (ETL) process, that is configured to receive a single input data set having multiple rows and place the multiple rows into a plurality of output data sets according to a pre-determined condition, wherein the data flow further includes a transform operation;
   prior to implementing the splitter operation, creating a staging table to receive data rows output from the transform operation prior to the data rows output from the transform operation being passed to the splitter operation; and generating an execution plan graph based on the data flow, the execution plan graph including structured query language (SQL) code for implementing the splitter operation,
wherein the structured query language (SQL) code is respectively executable among database servers associated with different vendors.

2. The method of claim 1, wherein the execution plan graph further includes database vendor specific structured query language (SQL) code that is executable only on one type of ETL engine associated with a given vendor.

3. The method of claim 1, wherein generating an execution plan graph based on the data flow includes:
converting the data flow into a corresponding logical operator graph (LOG), the logical operator graph (LOG) including a splitter operator corresponding to the splitter operation, the logical operator graph (LOG) representing an abstract collection of operators within the data flow; and generating the execution plan graph based on the logical operator graph (LOG).

4. The method of claim 3, wherein the logical operator graph (LOG) further includes one or more of a join operator, a filter operator, an extract operator, a bulk load operator, or an aggregate operator.

5. The method of claim 1, wherein the splitter operation receives a single input row set and produces a plurality of output row sets based on the single input row set, and wherein each of the single input row set and the plurality of output row sets comprises a plurality of rows.

6. The method of claim 1, wherein the structured query language (SQL) code comprises SQL (92/99) code.

7. The method of claim 6, wherein the structured query language (SQL) code of the execution plan graph comprises a SQL SELECT statement and an INSERT statement to implement the splitter operation of the data flow.

8. The method of claim 7, wherein:
a SQL SELECT statement is applied to each output data stream of the splitter operation; and
an INSERT statement is used to stage intermediate data rows into a staging table prior to the data rows being passed to the splitter operation.

9. A computer program product tangibly stored on a computer-readable medium, the computer program product comprising instructions for causing a programmable processor to:
receive a data flow including a splitter operation, the splitter operation comprising an operation in an extract, transform, and load (ETL) process, that is configured to receive a single input data set having multiple rows and place the multiple rows into a plurality of output data sets according to a pre-determined condition, wherein the data flow further includes a transform operation;
prior to implementing the splitter operation, create a staging table to receive data rows output from the transform operation prior to the data rows output from the transform operation being passed to the splitter operation; and
generate an execution plan graph based on the data flow, the execution plan graph including structured query language (SQL) code for implementing the splitter operation,
wherein the structured query language (SQL) code is respectively executable among database servers associated with different vendors.

10. The computer program product of claim 9, wherein the execution plan graph further includes database vendor specific structured query language (SQL) code that is executable only on one type of ETL engine associated with a given vendor.

11. The computer program product of claim 9, wherein the instructions to generate an execution plan graph based on the data flow include instructions to:
convert the data flow into a corresponding logical operator graph (LOG), the logical operator graph (LOG) including a splitter operator corresponding to the splitter operation, the logical operator graph (LOG) representing an abstract collection of operators within the data flow; and
generate the execution plan graph based on the logical operator graph (LOG).

12. The computer program product of claim 11, wherein the logical operator graph (LOG) further includes one or more of a join operator, a filter operator, an extract operator, a bulk load operator, or an aggregate operator.

13. The computer program product of claim 9, wherein the splitter operation receives a single input row set and produces a plurality of output row sets based on the single input row set, and wherein each of the single input row set and the plurality of output row sets comprises a plurality of rows.

14. The computer program product of claim 9, wherein the structured query language (SQL) code comprises SQL (92/99) code.

15. The computer program product of claim 14, wherein the structured query language (SQL) code of the execution plan graph comprises a SQL SELECT statement and an INSERT statement to implement the splitter operation of the data flow.

16. The computer program product of claim 15, wherein:
a SQL SELECT statement is applied to each output data stream of the splitter operation; and
an INSERT statement is used to stage intermediate data rows into a staging table prior to the data rows being passed to the splitter operation.

17. An extract, transform, and load (ETL) system comprising:
a code generation system configured to:
receive a data flow including a splitter operation, the splitter operation comprising an operation in an extract, transform, and load (ETL) process, that is configured to receive a single input data set having multiple rows and place the multiple rows into a plurality of output data sets according to a pre-determined condition, wherein the data flow further includes a transform operation;
prior to implementing the splitter operation, create a staging table to receive data rows output from the transform operation prior to the data rows output from the transform operation being passed to the splitter operation; and
generate an execution plan graph based on the data flow, wherein the execution plan graph includes structured query language (SQL) code for implementing the splitter operation, the structured query language (SQL) code being respectively executable among database servers associated with different vendors.

18. The extract, transform, and load (ETL) system of claim 17, wherein the execution plan graph further includes database vendor specific structured query language (SQL) code that is executable only on one type of ETL engine associated with a given vendor.

* * * * *